United States Patent [19]

Kuroiwa

[11] Patent Number: 5,689,303

[45] Date of Patent: Nov. 18, 1997

[54] ELECTRONIC STILL CAMERA UTILIZING UPDATABLE FRAME CATENA INFORMATION TO MAINTAIN FRAME SEQUENCE

[75] Inventor: Toshihisa Kuroiwa, Miura, Japan

[73] Assignee: Nikon Corporation, Tokyo, Japan

[21] Appl. No.: 658,302

[22] Filed: Jun. 5, 1996

Related U.S. Application Data

[63] Continuation of Ser. No. 500,110, Jul. 10, 1995, abandoned, which is a continuation of Ser. No. 95,918, Jul. 23, 1993, abandoned.

[30] Foreign Application Priority Data

Jul. 28, 1992 [JP] Japan ................................ 4-200044
Jun. 18, 1993 [JP] Japan ................................ 5-147194

[51] Int. Cl.$^6$ ............................................ H04N 5/225
[52] U.S. Cl. ........................ 348/232; 360/35.1; 386/117
[58] Field of Search ................................ 348/231, 232; 358/333, 906; 360/33.1, 36.1, 48, 14.2; 386/117

[56] References Cited

U.S. PATENT DOCUMENTS 4,573,084   2/1986  Iida ......................... 360/35.1 X
4,982,291   1/1991  Kurahashi et al. .................... 358/335
5,093,731   3/1992  Watanabe et al. .................. 360/35.1 X

*Primary Examiner*—Wendy Garber
*Attorney, Agent, or Firm*—Shapiro and Shapiro

[57] ABSTRACT

An electronic still camera is provided, which can maintain a photographing order (recording order) of frames by only partially updating information even when an arbitrary frame recorded in a memory is erased, and new data is re-recorded in the corresponding area. The camera may include a designation unit for designating arbitrary image data in a memory in which a plurality of image data and administration data for administering the image data are recorded, and an erase unit for erasing administration data corresponding to designated image data designated by the designation unit. Furthermore, the camera includes an updating unit for updating administration data corresponding to image data obtained by an image pickup operation immediately before the designated image data is obtained, or administration data corresponding to image data obtained immediately after the designated image data is obtained, in correspondence with an erase operation of the erase unit.

30 Claims, 8 Drawing Sheets

ELECTRONIC STILL CAMERA UTILIZING UPDATABLE FRAME CATENA INFORMATION TO MAINTAIN FRAME SEQUENCE

This is a continuation of application Ser. No. 08/500,110 filed Jul. 10, 1995, which is a continuation of application Ser. No. 08/095,918 filed Jul. 23, 1993, both now abandoned.

BACKGROUND OF THE INVENTION

1. Field of the Invention

The present invention relates to information representing a recording order of a plurality of image data recorded in a memory.

2. Related Background Art

Conventionally, an image pickup apparatus for recording image data, and administration data (e.g., addresses of image data) for administering image data in a memory along with image pickup operations is known.

Also, an image pickup apparatus for recording image data using, as a method of recording image data, a recording method of an apparatus (e.g., a personal computer) for recording data over a plurality of blocks in a memory which is divided in advance in units of blocks is known.

In a recording apparatus for recording data according to such a recording method, information (block catena information) representing connections of blocks in data recorded over a plurality of blocks is recorded in an administration data area. FIG. 1 shows a memory architecture used in such a conventional apparatus.

In an actual recording method (DOS FAT file system) of a personal computer, many other administration data are recorded in addition to administration data shown in FIG. 1. In FIG. 1 as well, administration data (e.g., the size of image data) can be added as needed. Referring to FIG. 1, a first block number area corresponds to a root directory area, a block catena information area corresponds to an FAT, and blocks in a data area correspond to clusters in a personal computer. The personal computer also has an IPL area in addition to these areas. In the personal computer, allocation of these areas and assignment of numbers (e.g., block numbers) are essentially the same as those in FIG. 1 although they are slightly different from FIG. 1.

Conventional recording will be described below with reference to FIG. 1.

In a memory, an image data recording area is divided into K blocks, and single image data is recorded using at least one block. An administration data area is allocated at the head of the memory. In this recording method, image data need not always be recorded in continuous blocks, but may be recorded over separate blocks. Administration data includes two kinds of information, i.e., a number of the first block of a plurality of blocks which store image data, and block catena information representing connections of a plurality of blocks which record single image data. First block number areas are required in correspondence with the number (N) of image data to be recorded, and block catena information areas are required in correspondence with the number (K) of blocks. In an example shown in FIG. 1, one image data (frame No. 1) alone is recorded, and is recorded over three blocks in a recording order of [block 1→block 2→block 4]. In this case, the administration data of frame No. 1 is as follows.

First block number 1 (block 1 is first data of frame No. 1)
Catena of block 1 2 (block 2 follows block 1)
Catena of block 2 4 (block 4 follows block 2)
Catena of block 4 end code of block catena Block 4 is the last block in which image data of frame No. 1 is recorded, and image data of frame No. 1 is not present in subsequent blocks. For this reason, an end code of block catena must be written. As the end code of block catena, a non-existing block number (e.g., K+1) is used. As block catena information for blocks which are not used for image data recording, 0 (non-existing block number) is written. With this code, empty blocks can be detected. Also, 0 is written as a first block number for a non-recorded frame, so that the non-recorded frame can also be detected.

The block catena information is information simply representing connections of blocks in which data is recorded, and does not include any information indicating a frame to which data of the block belongs. In contrast to this, the first block number includes information indicating a frame to which data belongs. Information representing a correspondence with a frame is a number (1 to N in FIG. 1) assigned to each element of the first block number area. Therefore, of the administration data area, the first block number area can be particularly called a frame administration area. In contrast to this, the block catena information area can be called a block administration area.

Referring to FIG. 1, numbers from 1 to N are assigned to N frame administration areas in turn from the first one. These numbers represent frame numbers, and frames can be administered using these numbers.

It should be noted that the fact that a frame number is assigned is different from the fact that image data of the frame is present. To record image data requires a procedure for registering the data in a frame of a certain number. More specifically, in this procedure, the first block number of blocks in which image data is recorded is written in one of the frame administration areas 1 to N. In a frame having the first block number 0, no image data is present although the frame number is assigned.

Normally, since image data is registered in turn from frame 1, the frame numbers represent the recording order of frames at the same time.

An electronic still camera has a remarkable feature, which is not provided to a silver chloride camera, i.e., it can erase data, and can re-record new data on the erased portion. In this case, to erase a certain frame is not to actually erase image data of the frame but to erase only administration data corresponding to the image data (i.e., initialize administration data to a value used when no image data is recorded). For example, in the recording system shown in FIG. 1, a frame is practically erased by setting the value of the first block corresponding to the frame to be erased to be 0, and setting the values of block catena for all blocks in which image data of the frame is recorded to be 0. When these values are set to be 0, areas where data is recorded so far are handled as data non-recorded areas. Therefore, when new image data is recorded in this state, new image data is overwritten on the image data of the erased frame. In the electronic still camera, image data can be repetitively recorded/erased in this manner.

However, in the conventional technique, when a recorded frame is erased, newly recorded data is registered in the frame of the erased frame number. For this reason, if a frame recorded after the erased frame has already been present, the frame numbers do not coincide with the recording order of frames.

In this case, if no new image data is registered in the frame of the erased frame number, a non-coincidence between the recording order of frames and the frame numbers can be avoided. However, a skipped frame number is formed. Upon repetition of recording/erasing of image data a large number of times, many skipped frame numbers are formed, and the frame number finally reaches an upper limit value (N in FIG. 1). When the frame number reaches the upper limit, even if the data area includes data non-recorded blocks, administration data (first block number) can no longer be written in the frame administration area. For this reason, image data cannot be newly recorded, and recording sufficiently utilizing a memory capacity is disturbed.

SUMMARY OF THE INVENTION

It is an object of the present invention to provide an image pickup apparatus which can easily recover a recording order of frames by only partially rewriting administration data even when erasing of an arbitrary frame and recording of new image data are repetitively performed.

In order to achieve the above object, according to the present invention, there is provided an electronic still camera including designation means (12) for designating arbitrary image data in a memory (7) for recording a plurality of image data and administration data for administering the plurality of image data, erase means (6, 8, 11) for erasing administration data corresponding to designated image data designated by the designation means, and updating means (6, 8), interlocked with the erase means, for updating administration data corresponding to first image data obtained by an image pickup operation immediately before the designated image data is obtained, or administration data corresponding to second image data obtained by an image pickup operation immediately after the designated image data is obtained.

Furthermore, according to the present invention, the electronic still camera includes recording means (6, 8) for recording, in units of frames, frame catena information representing a catena associated with an image pickup order of image data obtained by a current image pickup operation and image data obtained by an image pickup operation immediately before the current image pickup operation.

According to the present invention, since the erase means erases administration data corresponding to designated image data, and simultaneously, the updating means updates at least a portion of administration data corresponding to image data obtained by an image pickup operation before or after the designated image data is obtained, information associated with the image pickup order lost upon erasing of a frame can be restored.

According to the present invention, since frame catena information representing a catena associated with the image pickup order of frames is recorded in units of frames, the recording order from the first frame to the last frame can be tracked. For this reason, when a certain frame is searched, the frames need not be searched from the first frame, and data such as a recording date need not be checked, thus shortening the search time.

DESCRIPTION OF THE PREFERRED EMBODIMENTS

Figure 2:
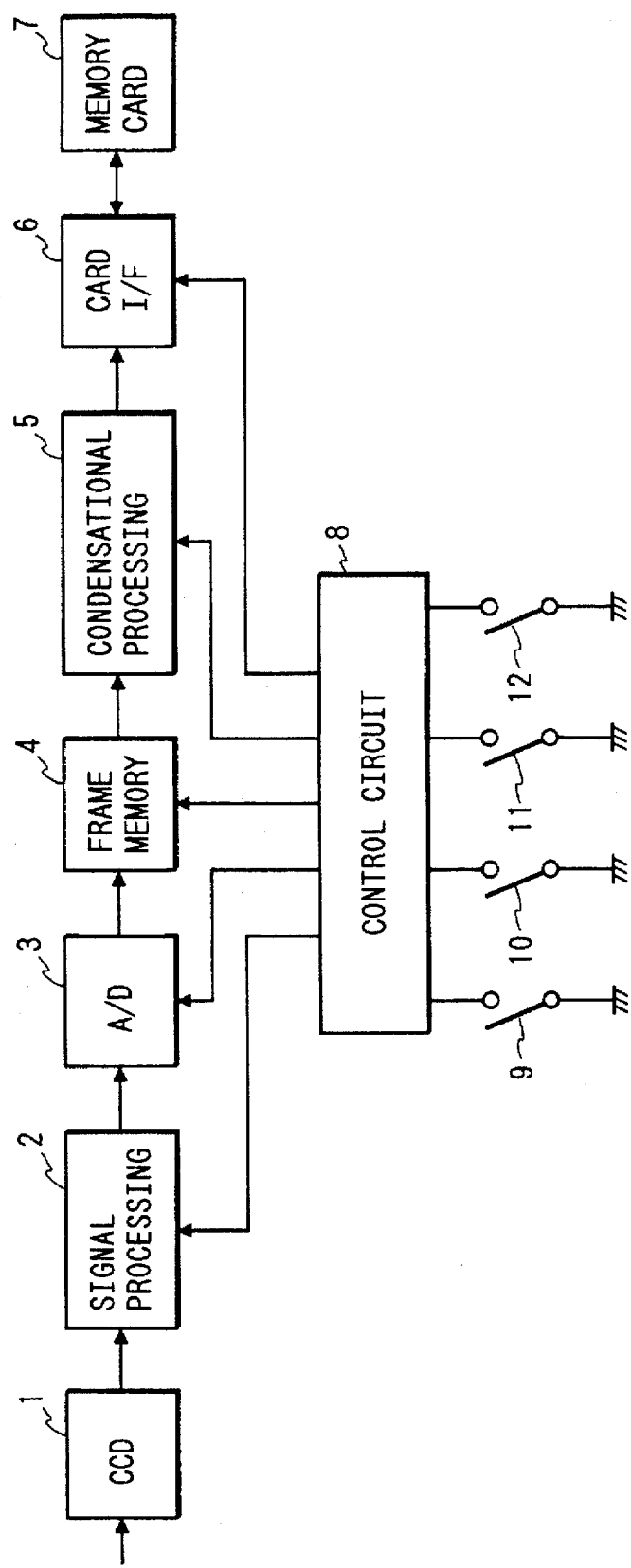
FIG. 2 is a block diagram showing an electronic still camera.

FIG. 2 is a block diagram showing an arrangement of a digital electronic still camera used in the present invention.

Light transmitted through a photographic lens (not shown) is set to have a proper light amount by controlling a shutter and an aperture, and is photoelectrically converted by a CCD 1 as an image pickup element. A signal processing unit 2 performs processing such as γ correction of a signal photoelectrically converted by the CCD 1, thereby generating an image signal. The image signal obtained by the signal processing unit 2 is converted by an A/D converter 3 into a digital image signal, and the digital image signal is temporarily stored in a frame memory 4.

The image data stored in the frame memory 4 is condensed by a condensational processing unit 5, and the condensed data is recorded in a memory card 7 via a card I/F 6.

A release switch 9 and a half-stroke depression switch 10 are switches interlocked with a release button (not shown). When the release button is depressed to its half-stroke position, and the half-stroke depression switch 10 is turned on, the power supply of the camera is turned on, and setup operations of various units such as a checking operation of the memory card 7 (a checking operation of the number of remaining frames), and the like are performed. When the half-stroke depression state is released, the power supply is turned off after an elapse of a predetermined period of time. When the release button is depressed to its full-stroke position, and the release switch 9 is turned on, an image pickup operation is started, and obtained image data is temporarily stored in the frame memory 4. Thereafter, the image data is condensed and recorded in the memory card 7.

An erase switch 11 is a switch interlocked with a data erase button (not shown). When the erase switch 11 is turned on, administration data corresponding to a frame designated by a designation switch 12 is erased. As a result, the designated frame is effectively erased.

Figure 1:
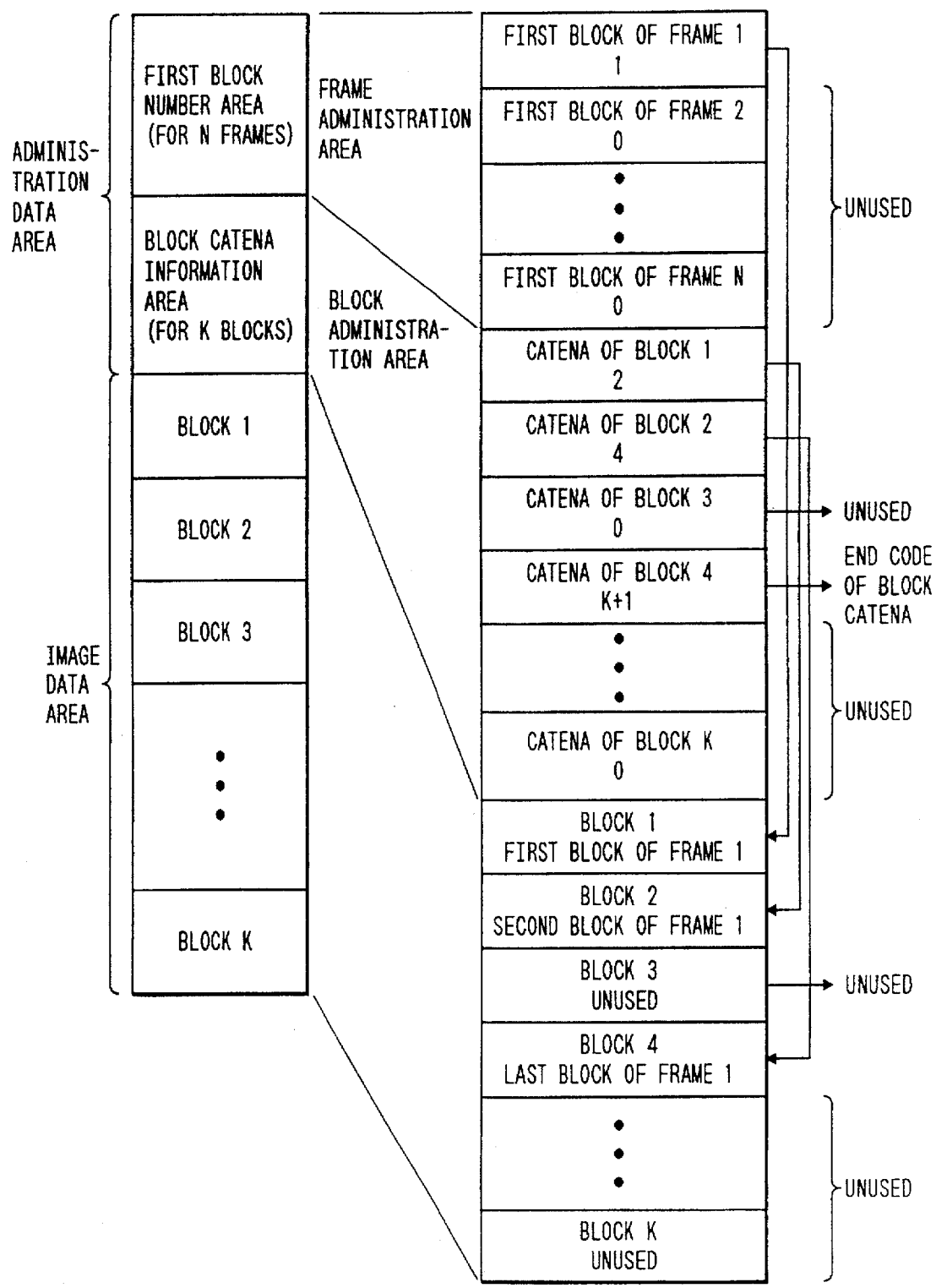
FIG. 1 is a view showing a conventional data administration system.
Figure 3:
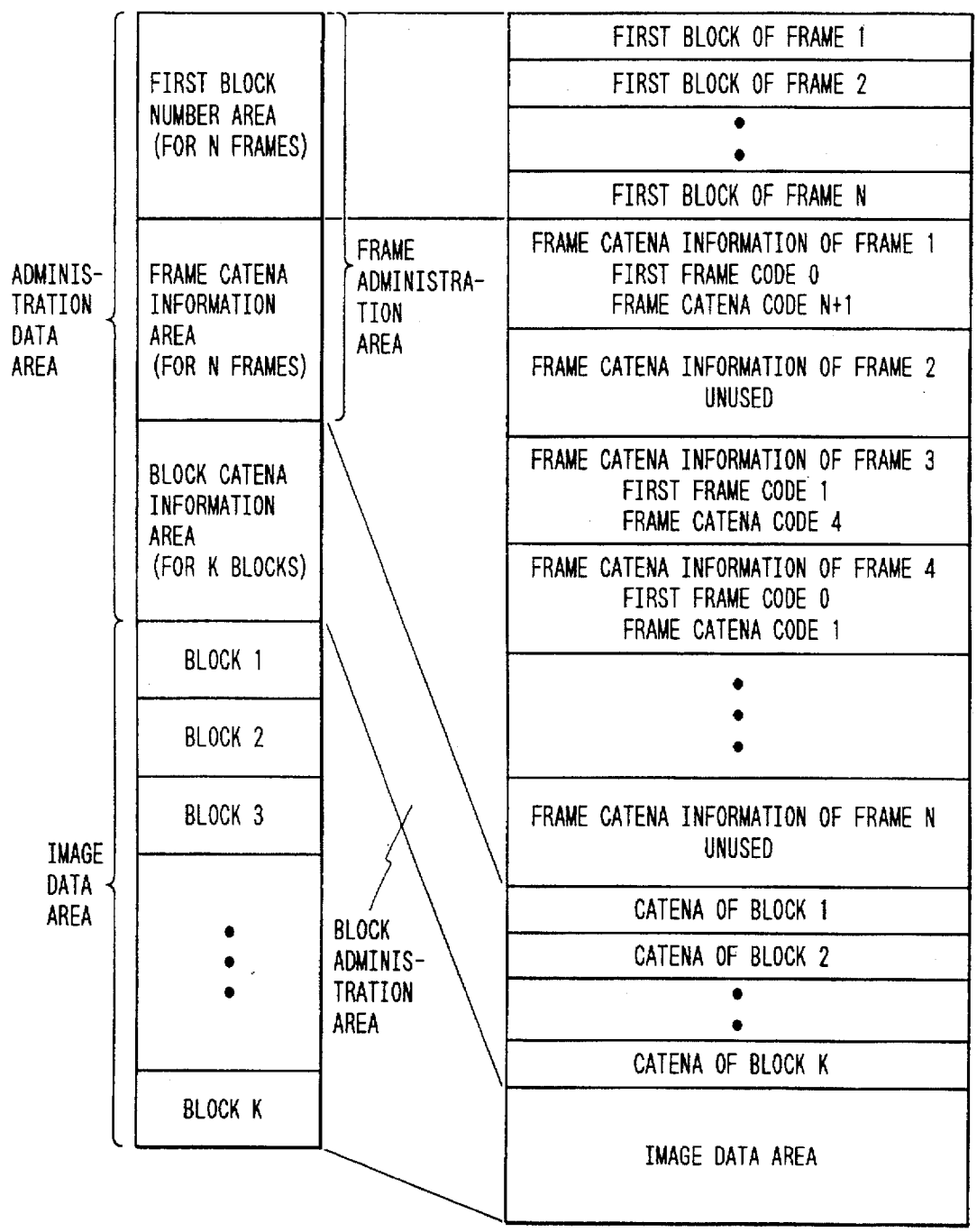
FIG. 3 is a view showing a data administration system according to the present invention.

FIG. 3 shows the use state of a memory according to the present invention. A difference from the prior art shown in FIG. 1 is that an area for storing frame catena information is added to the administration data area. A frame catena information area for N frames is assured since frame catena information is recorded for each frame. In this embodiment, although the frame catena information area is assured independently of the first block number area, these two data may be recorded as one set of data. A method of recording frame catena information is the same as that for block catena information. More specifically, as frame catena information of each frame, a frame number of a frame following the frame itself is recorded.

Referring to FIG. 3, for example, three image data of frame 3, frame 4, and frame 1 are recorded in the memory in the order of [frame 3→frame 4→frame 1]. In this case, frame catena information "4" is recorded for frame 3, and frame catena information "1" is recorded for frame 4. Since frame 1 is the current last frame, and no following frame is present, a code indicating that no following frame is present is recorded as frame catena information for frame 1. As an end code of frame catena, a non-existing frame number (e.g., N+1) can be used.

When image data for one frame is additionally recorded by a new image pickup operation, the frame catena information (written with the end code) for the frame as the last frame so far can be rewritten with a newly recorded frame number. For example, in an example shown in FIG. 3, if image data of frame 2 is newly recorded, frame catena information for frame 1 is "2", and frame catena information for frame 2 is N+1.

However, although the last frame can be identified by the end code of frame catena, frame catena cannot be tracked if the first frame is not known. For this purpose, as frame catena information, information indicating whether or not a corresponding image pickup frame is the first frame (to be referred to as a first frame code hereinafter), and the frame number of the next frame in frame catena (to be referred to as a frame catena code hereinafter) are recorded as a set of data.

As the first frame code, 1-bit data need only be used if the code is determined in correspondence with a numerical value "1" (first frame) or "0" (not first frame). Finally, frame catena information is stored, as shown in the right portion of FIG. 3. The same rules as in the prior art (FIG. 1) apply to those of administration data except for frame catena information.

Figure 4:
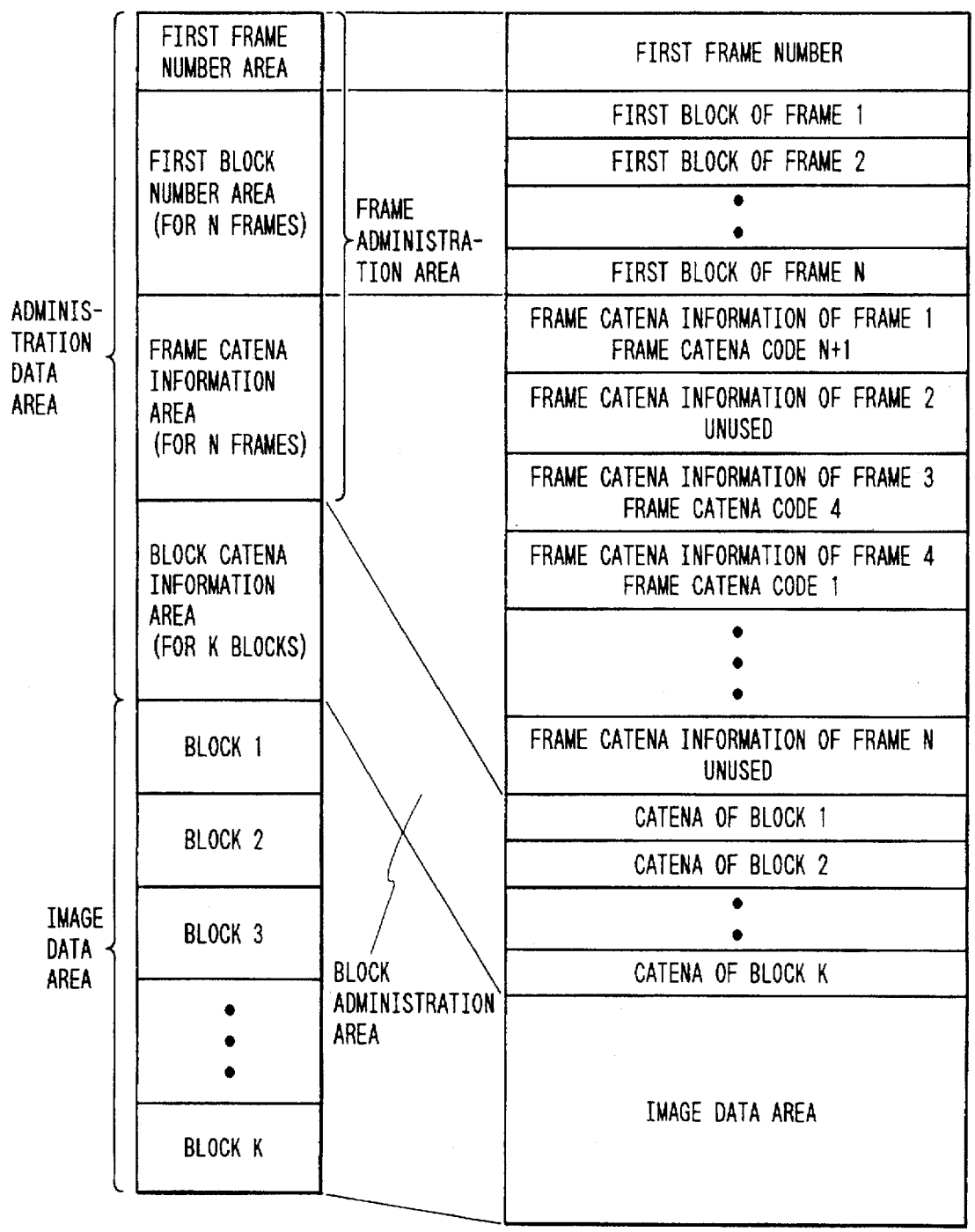
FIG. 4 is a view showing another embodiment of a data administration system according to the present invention.

In order to detect the frame number of the first frame, a method shown in FIG. 4 is also available in addition to the rules shown in FIG. 3. The method shown in FIG. 4 will be described below.

Referring to FIG. 4, an area for recording the frame numbers of first frames is independently assured (In FIG. 4, the area is assured at the head of the memory). As an advantage of this method, when this area is read, no searching is required since the value directly represents the frame number of the first frame. If the method shown in FIG. 4 is adopted, a frame catena code alone need be recorded as frame catena information.

An operation of a control circuit 8 in a recording mode of image data will be described below with reference to FIG. 5. Note that symbol F represents a first frame code. If F=1, it represents the first frame; if F=0, it represents a frame other than the first frame. Also, symbol P represents a frame catena code. If P=n, it represents that the corresponding frame is followed by an n-th frame; if P=N+1, it represents that the corresponding frame is the last frame.

When the release button is operated while the memory card is inserted in the image pickup apparatus, and the half-stroke depression switch 10 interlocked with the release button is turned on, the flow is started.

In step S10, it is checked if the release button (not shown) is operated, and the release switch 9 is turned on. If YES in step S10, the flow advances to step S11; otherwise, the flow advances to step 17.

It is checked in step S17 if the half-stroke depression switch 10 interlocked with the release button is turned on. If YES in step S17, the flow returns to step S10, and the above-mentioned two decision steps are repeated until the release switch 9 is turned on; if NO in step S17, the flow ends.

In step S11, it is checked if image data is recorded in the memory card. If image data has already been recorded in the memory card, the flow advances to step S12; if no image data is recorded at all, the flow advances to step S16.

In step S16, 1 is written in F as one of administration data for image data obtained by this image pickup operation. Thereafter, the flow advances to step S14.

In step S12, 0 is set in F, and the flow advances to step S13.

In step S13, P as another one of administration data for image data obtained by an image pickup operation immediately before the current image pickup operation is rewritten from N+1 to n. In this case, n is the frame number of image data obtained by the current image pickup operation. The frame number n does not mean that the corresponding frame is picked up in the n-th order, but is merely an administration number assigned to the frame.

In step S14, N+1 is written in P as administration data of image data obtained by the current image pickup operation.

In step S15, image data obtained by the current image pickup operation is recorded in the image data area of the memory card. Thereafter, the flow returns to step S10.

The above-mentioned operations are repeated every time the release button is depressed, and an image pickup operation is performed.

A data erase operation will be described below.

When a frame number to be erased is designated by the designation switch 12, all blocks in which image data of the designated frame is recorded are searched (block catena from the first block to the last block is tracked). When the blocks in which image data of the designated frame number is recorded are detected, the first block number and the block catena information of the frame are cleared to 0. Thus, image data can be registered again in the erased frame, and data can be recorded again in used blocks. When a frame is erased, since the frame catena state changes, the frame catena information is partially rewritten so as to preserve the recording order of the remaining frames after the frame is erased. This operation will be explained below with reference to FIG. 3.

(a) When frame 3 (first frame) is to be erased:
Since the second frame (i.e., frame 4) becomes the first frame, the first frame code of the frame catena information of frame 4 is changed to be 1 (indicating the first frame).

(b) When frame 4 (intermediate frame) is to be erased:
Since frame 1 follows frame 3, the frame catena code of the frame catena information of frame 3 is changed to be 1.

(c) When frame 1 (last frame) is to be erased:
Since frame 4 becomes the last frame, the frame catena code of the frame catena information of frame 4 is changed to be N+1.

An operation of the control circuit 8 in an erase mode of data will be described below with reference to FIG. 6.

When the power supply is turned on while the memory card is inserted in the image pickup apparatus, the flow is started.

In step S20, it is checked if the erase switch 11 is turned on. If YES in step S20, the flow advances to step S21; otherwise, the flow returns.

In step S21, it is checked if the frame number (n) designated by the designation switch 12 is a number representing the first frame. If YES in step S21, the flow advances to step S25; otherwise, the flow advances to step S22.

In step S25, the first frame code F of a frame next to the frame designated by the designation switch 12 is rewritten to be 1. Thus, the next frame is set as the first frame. Thereafter, the flow advances to step S24.

In step S22, it is checked if the frame number (n) designated by the designation switch 12 is a number representing an intermediate frame. The intermediate frame means a frame other than the first or last frame. If YES in step S22, the flow advances to step S26; otherwise (i.e., if n represents the last frame), the flow advances to step S23.

In step S26, the frame catena code P of a frame immediately before the designated frame (n) is rewritten to after be the frame number of a frame next to the frame (n). Thus, frame catena between the frame immediately before the designated frame and the frame immediately after the designated frame is achieved. Thereafter, the flow advances to step S24.

In step S23, P of a frame immediately before the designated frame (n) is rewritten to be (N+1). Thus, the frame immediately before the designated frame is set to be the last frame. Thereafter, the flow advances to step S24.

In step S24, administration data and image data of the frame number (n) designated by the designation switch 12 are erased, and thereafter, the flow returns.

A case will be described below wherein the present invention is applied to the currently used MS-DOS file format.

Figure 7:
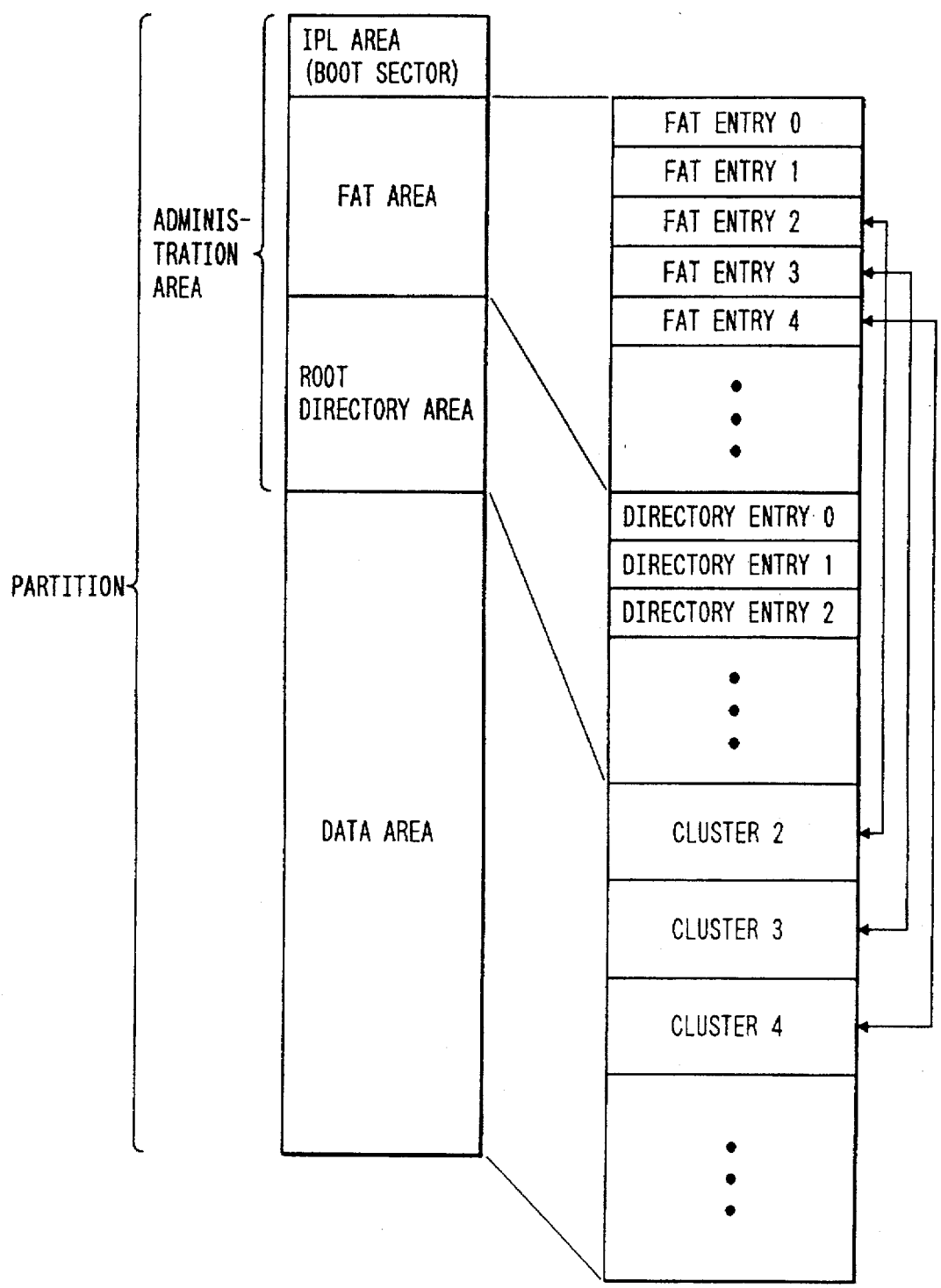
FIG. 7 is a view showing the outline of an MS-DOS file format.

FIG. 7 shows the outline of the MS-DOS file format. The format shown in FIG. 7 will be described below in comparison to FIG. 1.

FIG. 7 shows a data administration state in the MS-DOS file format. The entire area shown in FIG. 7 is called a partition, and in the case of a magnetic floppy disk, the entire disk serves as a single partition. In a large-capacity storage medium such as a hard disk, a single disk can be used while being divided into two or more partitions. In this case, these partitions are logically handled as different disks although they are physically present on a single disk. A memory card can be handled in the same manner as the disk, and can record data based on the MS-DOS file format.

As shown in FIG. 7, the MS-DOS partition is divided into an IPL area (also called a boot sector; to be described later), an FAT area (to be described later), a root directory area (to be described later), and a data area (to be described later).

In a recording medium such as a disk, a read/write access of data is made in units of a plurality of bytes (e.g., 512 bytes), and this unit is called a sector. Each of the above-mentioned areas is constituted by an integer number ($\geq 1$) of sectors.

Furthermore, the data area is divided into units called clusters, and each cluster is constituted by an integer number ($\geq 1$) of sectors. Each block in the data area shown in FIG. 1 corresponds to each cluster in FIG. 7.

The IPL area stores information such as IPL (Initial Program Loader), BPB (BIOS Parameter Block), and the like. The IPL is a program for loading the MS-DOS system on a main memory of a personal computer, and is not significant in a camera, which does not require system initialization.

The BPB stores information necessary for administering a disk (partition). More specifically, the BPB stores information associated with the total number of sectors included in the partition, the number of bytes per sector, the number of sectors per cluster, the sizes of areas, and the like. The start addresses of the areas can be calculated based on these information. A group of data (e.g., image data) is recorded as a file. In this case, the data is stored over a plurality of clusters.

Catena information representing connections among clusters is stored in the FAT (File Allocation Table) area. More specifically, the FAT area corresponds to the block catena information area shown in FIG. 1. When data are read out in turn while tracking the FAT from the head cluster, all data of the file can be correctly read out. Note that the FAT area stores cluster catena information, and does not store any first cluster number.

The first cluster number is recorded in the directory area. The directory area can have a hierarchical architecture, and has a root directory and sub directories. The start block number area shown in FIG. 1 corresponds to the root directory area. The directory area is, in a sense, a file administration ledger, and stores various kinds of information such as file names (within eight 1-byte characters), file extensions (within three 1-byte characters), file attributes (e.g., setting of hidden files, read-only files, and the like), dates and times of creation of files, first cluster numbers (corresponding to first block numbers in FIG. 1), file sizes (the number of bytes), and the like.

Of these information, the head of cluster catena can be detected from the first cluster number. Also, a file can be identified from a file name and a file extension.

Figure 8:
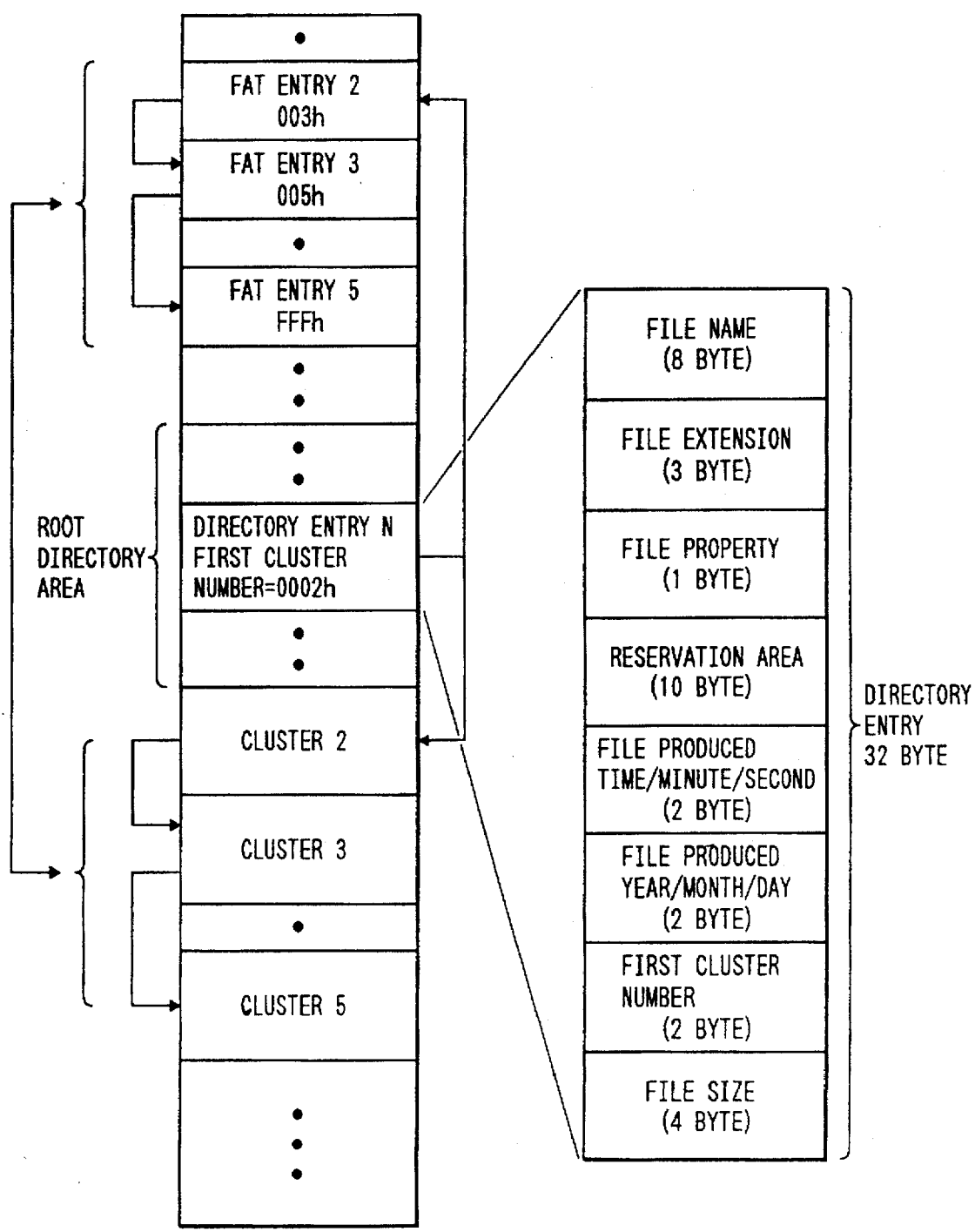
FIG. 8 is a view showing the details of the MS-DOS file format.

The directory information has a one-to-one correspondence with a file, and consists of 32 bytes (including unused 10 bytes). An area in units of 32 bytes constituting the directory information is called a directory entry, and FIG. 8 shows the detailed architecture of the directory entry.

The directory area is constituted by a plurality of directory entries. The BPB in the IPL area stores the total number of directory entries included in the root directory area. With this information, the size of the root directory area, and the maximum number of files recordable in the root directory area can be detected.

When files exceeding the maximum number of files are to be recorded, sub directories are created. A sub directory area is assured in the data area in the same manner as data of files. The architecture of the sub directory area is substantially the same as that of the root directory area except for locations on a recording medium.

In comparison to FIG. 1, since the MS-DOS format includes many kinds of information in the directory area, strict file administration can be performed. For example, in the administration method shown in FIG. 1, a file (image data) can only be identified by the frame number in the first block number area. However, in the MS-DOS format shown in FIG. 7, a file can be identified by a file name and a file extension in addition to an entry number (corresponding to the frame number in FIG. 1) for each directory entry.

In general, in a personal computer, the directory entry number is not administered by a user. Administration data which can be desirably set by a user includes a file name and a file extension. For this reason, when image data is recorded in the MS-DOS format in an electronic still camera, it is convenient if a file (image data) can be identified by a file name and a file extension.

For example, in the MS-DOS format, the file name and the file extension are expressed as follows.

●○○○▲▲▲.IMG

For example, if "●" is determined as a floppy name, "○○○" is determined as an ASCII code representing numerals, and it is determined that combinations "○○○" of three different numerals are used for different files, file names never overlap each other. In addition, if "○○○" is considered as a 3-digit number, "○○○" can be regarded as a frame number, and can be sufficiently used as information for identifying a frame (file).

If the frame number "○○○" ranges from 001 to 999, 999 frames of image data can be recorded in a recording medium, and this number of data is enough for an electronic still camera.

In this manner, the latter half portions "▲▲▲" and "△" of the file name can be utilized as other information.

If "▲▲▲" is used as frame catena information and last frame information, and "Δ" is used as a recording area of first frame information, the present invention can be applied to the MS-DOS file format.

An example will be described below. Assume that the following five files are recorded in a recording medium. The directory entry numbers which store directory information of these files are not particularly limited, and may be arbitrarily determined.

F001003F.IMG
F0020050.IMG
F0030020.IMG
F004FFF0.IMG
F0050040.IMG

The file names and the recording order of these files will be described below.

(1) About F001003F.IMG

"F001" is a portion representing the file name itself of this file. "003" represents the frame number of a catena destination of this file (recorded next to this file). In this case, "003" represents that a file "F003" is the next recorded file. "F" at the end of the file name represents that this frame (file) is the first frame.

(2) About F0020050.IMG

"F002" is the file name, "005" represents that a catena destination is "F005", and "0" represents that this frame is not the first frame.

(3) About F0030020.IMG

"F003" is the file name, "002" represents that a catena destination file is "F002", and "0" represents that this frame is not the first frame.

(4) About F004FFF0.IMG

"F004" is the file name, "FFF" represents that this frame is the last frame (finally recorded frame), and "0" represents that this frame is not the first frame.

(5) About F0050040.IMG

"F005" is the file name, "004" represents that a catena destination file is "F004", and "0" represents that this frame is not the first frame.

As described above, since the file names include the frame catena information and the first frame information, it can be detected that the recording (photographing) order of the five files is [F001003F.IMG→F0030020.IMG→F0020050.IMG→F0050040.IMG→F004FFF0.IMG]. It should be noted that the frame number "○○○" does not correspond to the recording order of files. Therefore, when file names are determined, arbitrary frame numbers can be used as long as they do not overlap each other. The portions "▲▲▲" and "Δ" include information of the recording order.

In the above example, the file extension is fixed to IMG, and is not used for recording frame catena information and first frame information. However, the extension portion can be used as needed.

When the present invention is applied to the MS-DOS file format, since the first cluster number (corresponding to the first block number), file name, and file extension (used as frame catena information and first frame information) are recorded in a single directory entry, this means that the first block number, frame catena information, and first frame information are recorded as a set of information. More specifically, such a set of information corresponds to a combination of the first block number area and the frame catena information area in FIG. 4.

Figure 5:
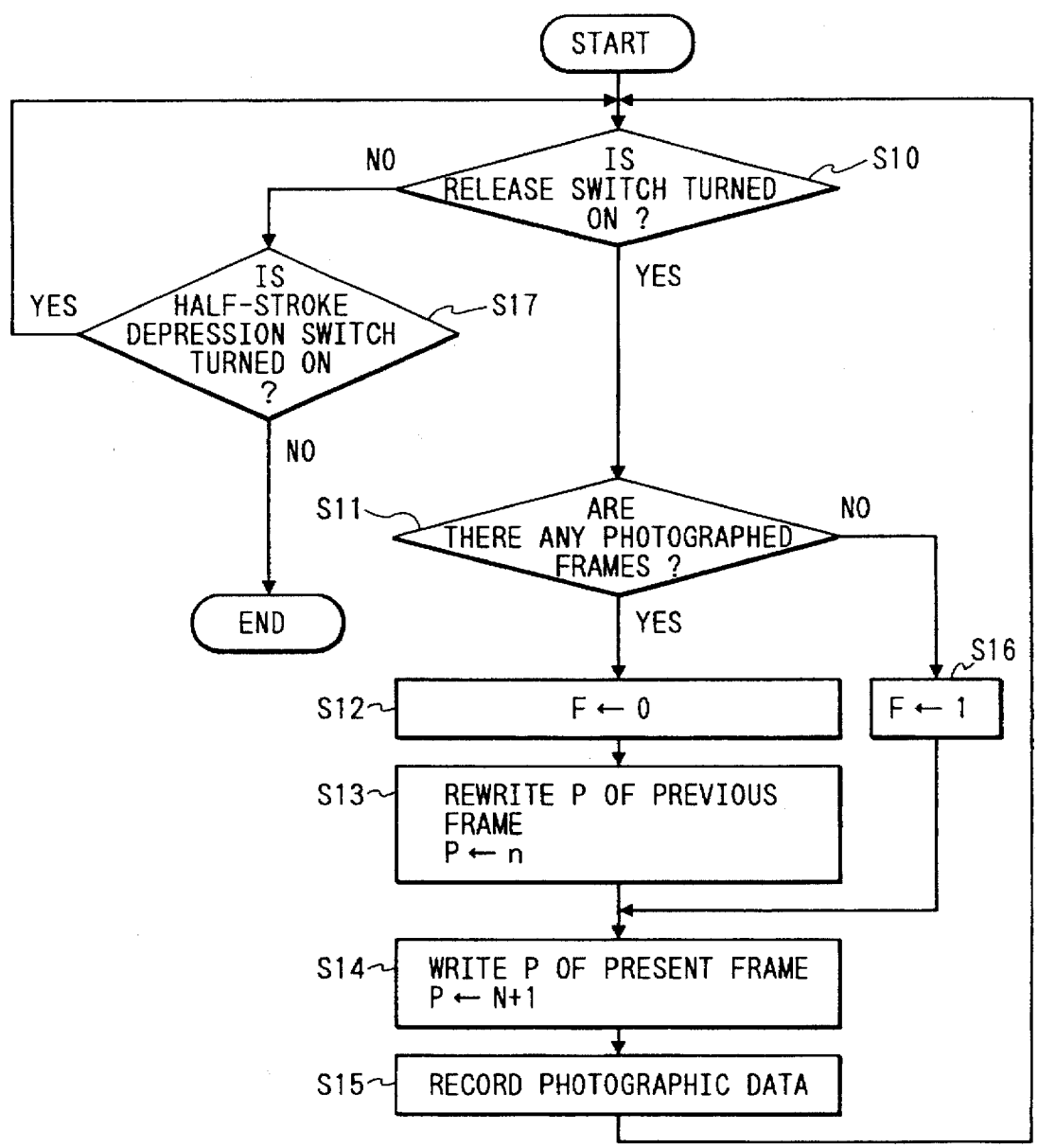
FIG. 5 is a flow chart showing an operation of a control circuit in a recording mode.
Figure 6:
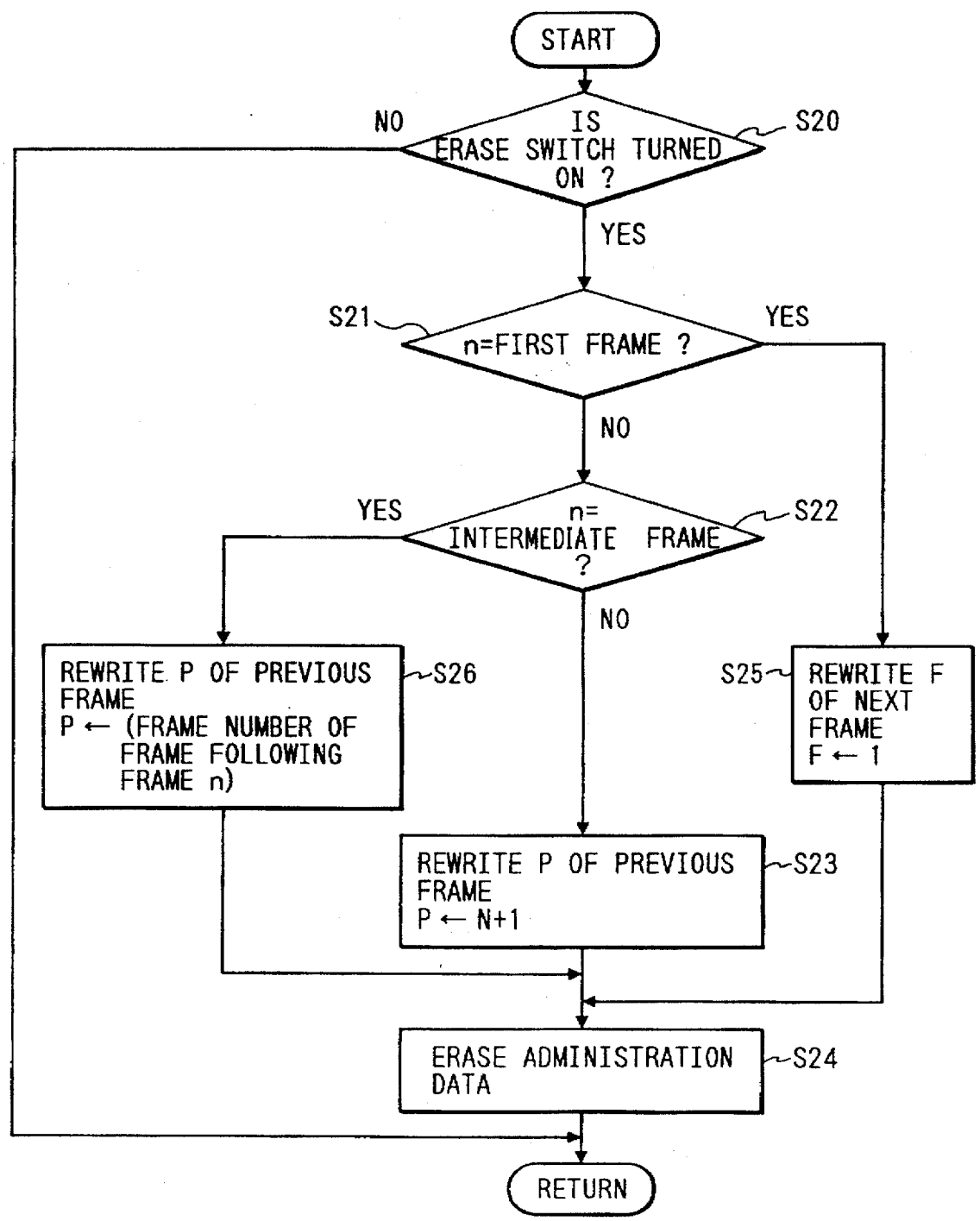
FIG. 6 is a flow chart showing an operation of the control circuit in an erase mode.

Since recording and updating operations of frame catena information in the MS-DOS file format are the same as those in FIGS. 5 and 6, a detailed description thereof will be omitted.

In this embodiment, an IC memory card is used as an image data recording medium. However, the present invention is not limited to this.

In this embodiment, image data is condensed. However, the present invention is not limited to this. For example, non-condensed data may be recorded in a memory card, or an image data condensation or non-condensation mode may be selectively used.

Furthermore, if an image pickup apparatus can record data in a memory card in a real-time manner, the frame memory 4 can be omitted.

Furthermore, in this embodiment, a frame number to be connected next is recorded (a catena destination is recorded) as frame catena information (frame catena code P). However, the present invention is not limited to this. For example, information representing an immediately preceding connected frame, i.e., a catena source, may be recorded. An example for recording a catena source as frame catena information will be described below.

Referring to FIG. 3, three image data of frame 3, frame 4, and frame 1 are recorded in the memory in the order of [frame 3→frame 4→frame 1]. In this case, frame catena information (catena source) is 4 for frame 1, and 3 for frame 4. Since frame 3 is the current first frame, and no frame is present before frame 3, a code representing that no frame is present before the corresponding frame is recorded as frame catena information for frame 3. As a start code of frame catena, a non-existing frame number (e.g., N+1) can be used.

In this case, since frame catena is tracked from the last frame in turn, the last frame must be known. For this purpose, in place of the first frame code in the embodiment shown in FIG. 3, a last frame code need only be recorded. As the last frame code, for example "1" and "0" are used, and the last frame code can be recorded in correspondence with information "1" indicating "last frame" and "0" indicating "not last frame".

The method of recording a catena source of frame catena can be applied to the MS-DOS file format as follows. More specifically, if "▲▲▲" is defined as a frame number of a catena source ("FFF" is defined as a code representing the first frame), and "Δ" is defined as last frame information ("F" indicates "last frame" and "0" indicates "not last frame"), since frame catena can be tracked from the last frame, the recording order can be detected in the same manner as described above.

What is claimed is:

1. An electronic still camera, comprising:

a designation device for designating, according to the choice of a user, a used frame of image data in a memory, said memory recording image data in a plurality of frames, administration data in association with each frame which indicates whether or not the frame is used, and frame catena data in association with each frame which identifies a next frame, if any, in one of a forward or backward time sequence of use of used frames in said memory;

an erase device for changing the administration data associated with the designated frame to indicate that the designated frame is not used; and an updating device operating in association with the operation of said erase device for updating the frame catena data associated with a used frame, if any, immediately preceding the designated frame in sequence, by changing the frame catena data of said preceding frame to the frame catena data of the designated frame.

2. A method of administering data in an electronic still camera, comprising:

designating a used frame of image data in a memory, said memory recording image data in a plurality of frames, administration data in association with each frame which indicates whether or not the frame is used, and frame catena data in association with each frame which identifies a next frame, if any, in one of a forward or backward time sequence of use of used frames in said memory;

changing the administration data corresponding to the designated frame to indicate that the designated frame is not used; and updating the frame catena data of a used frame, if any, immediately preceding the designated frame in sequence, by changing the frame catena data of said preceding frame to the frame catena data of the designated frame.

3. An electronic still camera according to claim 1, further comprising an intermediate frame discrimination means portion for discriminating whether the designated frame is an intermediate frame of the sequence, and wherein said updating device means updates the frame catena data of said preceding used frame based on the discrimination result.

4. An electronic still camera according to claim 1, further comprising a first frame discrimination portion for discriminating whether the designated frame is a first frame of the sequence, and wherein said updating device updates the frame catena data of said next used frame to indicate that said next used frame is the first frame of the sequence when the designated frame is discriminated as the first frame.

5. An electronic still camera according to claim 1, further comprising a last frame discrimination portion for discriminating whether the designated frame is a last frame of the sequence, and wherein said updating device updates the frame catena data of said preceding used frame to indicate that said preceding used frame is the last frame of the sequence when the designated frame is discriminated as the last frame.

6. An electronic still camera according to claim 1, wherein said memory records the image data in an MS-DOS file format, and the administration data is contained in directory entries.

7. An electronic still camera according to claim 1, wherein said image data is recorded in an MS-DOS file format, and the frame catena data associated with each frame is contained in a corresponding file name.

8. An electronic still camera according to claim 7, wherein said file name includes a file extension.

9. A method of administering data in an electronic still camera according to claim 2, further comprising discriminating whether the designated frame is an intermediate frame of the sequence, and wherein said updating is effected based on the discrimination result.

10. A method of administering data in an electronic still camera according to claim 2, further comprising discriminating whether the designated frame is a first frame of the sequence and, when the designated frame is discriminated as the first frame, updating the frame catena data of said next used frame to indicate that said next used frame is the first frame of the sequence.

11. A method of administering data in an electronic still camera according to claim 2, further comprising discriminating whether the designated frame is a last frame of the sequence and, when said designated frame is discriminated as the last frame, updating the frame catena data of said preceding used frame to indicate that said preceding used frame is the last frame of the sequence.

12. A method of administering data in an electronic still camera, comprising:

designating a frame of image data in a memory which records image data in a plurality of frames and which records, association with each frame, frame catena data identifying a next frame, if any, in one of a forward or backward time sequence of use of used frames in said memory; and updating the frame catena data of a used frame, if any, immediately preceding the designated frame in sequence, by changing the frame catena data of said preceding frame to the frame catena data of the designated frame.

13. An electronic still camera, comprising:

a designation device for designating, according to the choice of a user, a frame of image data in a memory which records image data in a plurality of frames and which records, in association with each frame, frame catena data identifying a next an frame, if any, in one of a forward or backward time sequence of use of used frames in said memory; and an updating device for updating the frame catena data associated with a used frame, if any, immediately preceding the designated frame in sequence, by changing the frame catena data of said preceding frame to the frame catena data of the designated frame.

14. An electronic still camera according to claim 13, further comprising a intermediate frame discrimination portion for discriminating whether the designated frame is an intermediate frame of the sequence, and wherein said updating device updates the frame catena data of said preceding used frame based on the discrimination result.

15. An electronic still camera according to claim 13, further comprising a first frame discrimination portion for discriminating whether the designated frame is a first frame of the sequence, and wherein said updating device updates the frame catena data of said next used frame to indicate that said next used frame is the first frame of the sequence when the designated frame is discriminated as the first frame.

16. An electronic still camera according to claim 13, further comprising a last frame discrimination portion for discriminating whether the designated frame is a last frame of the sequence, and wherein said updating device updates the frame catena data of said preceding used frame to indicate that said preceding used frame is the last frame of the sequence when the designated frame is discriminated as the last frame.

17. An electronic still camera, comprising:

a recording device for recording, in a memory, frames of image data and frame catena data in association with each frame of image data, said frame catena data identifying a next frame, if any, in one of a forward or backward time sequence of use of the frames.

18. An electronic still camera according to claim 17, wherein said recording device records the frame catena data associated with each frame in association with an image pickup operation of that frame.

19. An electronic still camera according to claim 17, wherein said recording device records first-frame information for identifying a first frame of the sequence.

20. An electronic still camera according to claim 17, wherein said recording device records last-frame information for identifying a last frame of the sequence.

21. An electronic still camera according to claim 20, wherein said recording device records last-frame information in association with an image pickup operation of each frame.

22. An electronic still camera according to claim 17, wherein said image data is recorded in an MS-DOS file format, and the frame catena data associated with each frame is contained in a corresponding file name.

23. An electronic still camera according to claim 22, wherein said file name includes a file extension.

24. An image recording apparatus comprising:
- a memory for storing a plurality of image data and a plurality of image-correspondent data in correspondence with each other;
- an editing device for editing said plurality of image data, said editing device including an erasing device for erasing selected image data; and
- an updating device that updates image-correspondent data, corresponding to unerased image data, in an update operation that is automatically initiated as a concomitant of an erase operation of said erasing device.

25. An image recording apparatus according to claim 24, wherein said image-correspondent data is information for ordering said plurality of image data in a predetermined manner.

26. An image recording apparatus according to claim 25, wherein when selected image data is erased by said erasing device, said updating device updates image-correspondent data corresponding to unerased image data so as to maintain the ordering of the remainder of said plurality of image data.

27. An image recording apparatus according to claim 25, wherein said image-correspondent data is information for ordering the plurality of image data according to a photographed order.

28. An image recording apparatus according to claim 24, wherein said updating operation is performed substantially at a same time as said erase operation.

29. An image recording apparatus according to claim 25, wherein said updating operation is performed substantially at a same time as said erase operation.

30. An image recording apparatus according to claim 26, wherein said updating operation is performed substantially at a same time as said erase operation.

* * * * *